(12) United States Patent
Wang et al.

(10) Patent No.: US 10,033,422 B2
(45) Date of Patent: Jul. 24, 2018

(54) EUICC MANAGEMENT METHOD, EUICC, SM PLATFORM, AND SYSTEM

(71) Applicant: HUAWEI TECHNOLOGIES CO., LTD., Shenzhen, Guangdong (CN)

(72) Inventors: Tao Wang, Shenzhen (CN); Shuiping Long, Beijing (CN); Linyi Gao, Beijing (CN); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/358,506

(22) Filed: Nov. 22, 2016

(65) Prior Publication Data
US 2017/0077975 A1    Mar. 16, 2017

Related U.S. Application Data

(63) Continuation of application No. PCT/CN2014/078257, filed on May 23, 2014.

(51) Int. Cl.
| H04B 1/38 | (2015.01) |
| H04B 1/3816 | (2015.01) |
| G06F 15/177 | (2006.01) |
| H04W 8/18 | (2009.01) |

(52) U.S. Cl.
CPC ......... *H04B 1/3816* (2013.01); *G06F 15/177* (2013.01); *H04W 8/183* (2013.01)

(58) Field of Classification Search
CPC ..... H04B 1/3816; H04W 8/183; G06F 15/177
USPC .................................................. 455/557, 558
See application file for complete search history.

(56) References Cited

U.S. PATENT DOCUMENTS

| 9,451,459 B2 | 9/2016 | Lee et al. |
| 9,462,457 B2 | 10/2016 | Gao et al. |
| 2006/0085848 A1 | 4/2006 | Aissi et al. |
| 2008/0114570 A1 | 5/2008 | Li et al. |
| 2009/0036126 A1 | 2/2009 | Morikuni et al. |

(Continued)

FOREIGN PATENT DOCUMENTS

| CN | 1787665 | 6/2006 |
| CN | 101114933 A | 1/2008 |

(Continued)

OTHER PUBLICATIONS

International Search Report dated Feb. 26, 2015 in corresponding International Application No. PCT/CN2014/078257.

(Continued)

*Primary Examiner* — Ayodeji Ayotunde
(74) *Attorney, Agent, or Firm* — Staas & Halsey LLP

(57) ABSTRACT

The present invention provides an eUICC management method, an eUICC, an SM platform, and a system. The method includes: acquiring, by an eUICC, capability information of a terminal in which the eUICC is embedded; and sending, by the eUICC, the capability information of the terminal to an SM platform, so that the SM platform manages a profile on the eUICC or generates a profile or manages the eUICC according to the capability information of the terminal. Capability information of a terminal in which the eUICC is embedded is reported to an SM platform, so that processing such as generation or management of a configuration file can match the capability information of the terminal, which improves processing accuracy.

17 Claims, 4 Drawing Sheets

```
┌─────────────────────────────────────────────┐
│ An embedded universal integrated circuit    │ ── 101
│ card eUICC acquires capability information  │
│ of a terminal in which the eUICC is embedded│
└─────────────────────────────────────────────┘
                      │
                      ▼
┌─────────────────────────────────────────────┐
│ The eUICC sends the capability information  │
│ of the terminal to a subscription           │ ── 102
│ management SM platform, so that the SM      │
│ platform manages a configuration file       │
│ profile on the eUICC or generates a profile │
│ or manages the eUICC according to the       │
│ capability information of the terminal      │
└─────────────────────────────────────────────┘
```

(56) References Cited

U.S. PATENT DOCUMENTS

| | | | |
|---|---|---|---|
| 2009/0111467 A1 | 4/2009 | Chai et al. | |
| 2010/0279674 A1 | 11/2010 | Zou et al. | |
| 2011/0191252 A1 | 8/2011 | Dai | |
| 2012/0115440 A1 | 5/2012 | Naito et al. | |
| 2012/0190354 A1 | 6/2012 | Merrien et al. | |
| 2013/0012168 A1 | 1/2013 | Rajadurai et al. | |
| 2013/0157673 A1* | 6/2013 | Brusilovsky | H04W 8/205 455/450 |
| 2013/0231087 A1* | 9/2013 | O'Leary | H04W 8/22 455/411 |
| 2013/0339305 A1 | 12/2013 | Kim et al. | |
| 2014/0011541 A1 | 1/2014 | Cormier et al. | |
| 2014/0012755 A1 | 1/2014 | Walker et al. | |
| 2014/0235210 A1* | 8/2014 | Park | H04W 12/04 455/411 |
| 2014/0237101 A1 | 8/2014 | Park | |
| 2014/0287725 A1 | 9/2014 | Lee | |
| 2014/0329502 A1* | 11/2014 | Lee | H04W 12/06 455/411 |
| 2015/0011202 A1 | 1/2015 | Guo et al. | |
| 2015/0087269 A1 | 3/2015 | Lee et al. | |
| 2015/0208239 A1 | 7/2015 | Bai et al. | |
| 2016/0337861 A1 | 11/2016 | Hawkes et al. | |

FOREIGN PATENT DOCUMENTS

| | | |
|---|---|---|
| CN | 101119387 | 2/2008 |
| CN | 101146346 A | 3/2008 |
| CN | 101159615 | 4/2008 |
| CN | 101453714 | 6/2009 |
| CN | 101471871 A | 7/2009 |
| CN | 102184110 | 9/2011 |
| CN | 102314408 | 1/2012 |
| CN | 102497630 | 6/2012 |
| CN | 102630081 | 8/2012 |
| CN | 102917338 | 2/2013 |
| CN | 101895844 | 6/2013 |
| CN | 103370915 | 10/2013 |
| CN | 103686587 | 3/2014 |
| CN | 103747104 | 4/2014 |
| CN | 103782568 | 5/2014 |
| EP | 2222024 | 8/2010 |
| EP | 2461613 | 6/2012 |
| EP | 2854432 | 4/2015 |
| EP | 2858393 | 4/2015 |
| EP | 2 575 292 B1 | 6/2016 |
| FR | 2994048 | 1/2014 |
| KR | 1020130026958 | 3/2013 |
| KR | 1020130049726 | 5/2013 |
| WO | WO2012076464 | 6/2012 |
| WO | WO2012085593 | 6/2012 |
| WO | WO2013027085 | 2/2013 |
| WO | WO2013036010 | 3/2013 |
| WO | WO2013048084 | 4/2013 |
| WO | WO2013123233 | 8/2013 |
| WO | WO2013176499 | 11/2013 |
| WO | WO2014059913 | 4/2014 |

OTHER PUBLICATIONS

Chinese Office Action dated Dec. 11, 2017 in corresponding Chinese Patent Application 201480056228.0.
International Search Report, dated Jan. 16, 2014, in International Application No. PCT/CN2013/085222 (4 pp.).
Written Opinion of the International Searching Authority, dated Jan. 16, 2014, in International Application No. PCT/CN2013/085222 (8 pp.).
International Search Report, dated Jan. 23, 2014, in International Application No. PCT/CN2013/086644 (4 pp.).
Written Opinion of the International Searching Authority, dated Jan. 23, 2014, in International Application No. PCT/CN2013/086644 (10 pp.).
International Search Report, dated Feb. 26, 2015, in International Application No. PCT/CN2014/078257 (4 pp.).
International Search Report, dated Mar. 6, 2015, in International Application No. PCT/CN2014/093106 (4 pp.).
Written Opinion of the International Searching Authority, dated Mar. 6, 2015, in International Application No. PCT/CN2014/093106 (7 pp.).
International Search Report, dated Mar. 27, 2015, in International Application No. PCT/CN2014/081776 (5 pp.).
Extended European Search Report, dated Oct. 2, 2015, in European Application No. 13847443.2 (4 pp.).
Extended European Search Report, dated Oct. 28, 2015, in European Application No. 13852843.5 (10 pp.).
Office Action, dated May 4, 2016, in Chinese Application No. 201210390400.9 (6 pp.).
Extended European Search Report, dated Sep. 28, 2016, in European Application No. 14867716.4 (12 pp.).
Extended European Search Report, dated Apr. 6, 2017, in European Application No. 14892527.4 (9 pp.).
Extended European Search Report, dated May 9, 2017, in European Application No. 14897155.9 (9 pp.).
*Embedded SIM Task Force Requirements and Use Cases 1.0*, Feb. 21, 2011, GSM Association, XP062097169, pp. 1-38.
*Embedded SIM Task Force Requirements and Use Cases 1.0*, Feb. 21, 2011, GSM Association, pp. 1-38.
*Embedded UICC, A High Level Remote Provisioning Architecture*, GSMA Embedded SIM Task Force Technical Stream, XP014099004 (16 pp.).
<Smart Cards; Embedded UICC; Requirements Specification>, Draft ETSI TS 103 383 V<0.0.6>, May 2011, XP14099322, pp. 1-20.
*Reprogrammable SIMs: Technology, Evolution and Implications, Final Report*, CSMG, Sep. 25, 2012, XP002716258 (96 pp.).
*Reprogrammable SIMs: Technology, Evolution and Implications, Final Report*, CSMG, Sep. 25, 2012, pp. 1-95.
*Liaison Statement: GSMA's Embedded SIM Remote Provisioning Architecture Document*, GSMA, May 28, 2013 (2 pp.).
*Remote Provisioning Architecture for Embedded UICC, Version 1.43*, Jul. 1, 2013, GSM Association, pp. 1-82.
*LS on GSMA's Embedded SIM Remote Provisioning Architecture Document*, ETSI TC SCP REQ Meeting #44, Tdoc SCPREQ(13)000077, Basking Ridge, NJ, USA; Jul. 8-10, 2013 (1 pg.).
*Smart Cards; Embedded UICC; Technical Specification (Release 12)*, ETSI TS 103 384 V0.6.0 (Mar. 2014), pp. 1-14.
*Smart Cards; Embedded UICC; Requirements Specification (Release 12)*, ETSI TS 103 383 V12.4.0 (Apr. 2014), pp. 1-22.
*eUICC Manager*, Apple, Inc., May 25, 2014, SCPTEC(14)000075 (4 pp.).
*Change Request for eUICC Architecture*, ETSI TC SCP TEC Meeting #52, Seoul, South Korea, Jun. 2-6, 2014 SCPTEC(13)000130r6 (4 pp.).
*eUICC security framework*, ETSI SCPTEC#47, SCPTEC(13)000037, pp. 1-12.
Zhimin, D., *Embedded UICC and its Remote Management Technology*, pp. 48-51.
U.S. Appl. No. 14/586,664, filed Dec. 30, 2014, Linyi Gao et al.
U.S. Appl. No. 14/705,294, filed May 6, 2015, Linyi Gao et al.

* cited by examiner

EUICC MANAGEMENT METHOD, EUICC, SM PLATFORM, AND SYSTEM

CROSS-REFERENCE TO RELATED APPLICATIONS

This application is a continuation of International Application No. PCT/CN2014/078257, filed on May 23, 2014, the disclosure of which is hereby incorporated by reference in its entirety.

TECHNICAL FIELD

Embodiments of the present invention belong to the field of wireless communications technologies, and specifically relate to an eUICC management method, an eUICC, an SM platform, and a system.

BACKGROUND

An embedded Universal Integrated Circuit Card (embedded Universal Integrated Circuit Card, eUICC for short) is a UICC that is embedded in a terminal and that cannot be inserted or removed. It may be implemented that an operator and a corresponding subscription management SM platform that includes a subscription manager-secure routing (Subscription Manager-Secure Routing, SM-SR for short), a subscription manager-data preparing (Subscription Manager-Data Preparing, SM-DP for short), and the like perform remote management on an eUICC, for example, download subscription data of the operator, access a mobile network of the operator, or perform handover between mobile networks of the operator.

In the prior art, after producing a batch of eUICCs, a card manufacturer, that is, an eUICC manufacturer (eUICC Manufacturer, EUM for short) initiates a registration procedure to an SM platform associated with these eUICCs, where an information set (eUICC Information Set, EIS for short) of each eUICC is carried in a registration request message, and each EIS includes information such as an identifier, a type, a version number, a production date, and a credential of the eUICC.

After the foregoing registration procedure, for each eUICC for which the SM is responsible of configuration and management, the SM platform saves a corresponding EIS in a database as an important parameter for subsequent processing procedures such as configuration and management of a configuration file (Profile).

In the foregoing prior art, an EUM initiates a registration procedure when eUICCs are delivered from a factory, so that an SM platform obtains an EIS that includes eUICC initial information such as identifiers, types, version numbers, and production dates of the eUICCs, and performs, based on the initial EIS, a subsequent processing procedure such as generation and management of profiles. Therefore, accuracy of a processing result is generally not high.

SUMMARY

Embodiments of the present invention provide an eUICC management method, an eUICC, an SM platform, and a system, to overcome a disadvantage in the prior art that accuracy of a processing result is generally not high because of processing procedures such as generation and management of a profile based on an initial EIS of an eUICC.

A first aspect of the embodiments of the present invention provides an eUICC management method, including:

acquiring, by an embedded universal integrated circuit card eUICC, capability information of a terminal in which the eUICC is embedded; and sending, by the eUICC, the capability information of the terminal to a subscription management SM platform, so that the SM platform manages a configuration file profile on the eUICC or generates a profile or manages the eUICC according to the capability information of the terminal.

According to the first aspect, in a first possible implementation manner of the first aspect, the sending, by the eUICC, the capability information of the terminal to a subscription management SM platform, so that the SM platform manages a configuration file profile on the eUICC or generates a profile or manages the eUICC according to the capability information of the terminal includes:

sending, by the eUICC, the capability information of the terminal to the SM platform, so that the SM platform updates the capability information of the terminal to an eUICC information set EIS of the eUICC, and manages the profile on the eUICC or generates a profile or manages the eUICC according to the updated EIS.

According to the first aspect or the first possible implementation manner of the first aspect, in a second possible implementation manner of the first aspect, after the acquiring, by an embedded universal integrated circuit card eUICC, capability information of a terminal in which the eUICC is embedded, the method further includes:

locally saving, by the eUICC, the capability information of the terminal.

According to the second possible implementation manner of the first aspect, in a third possible implementation manner of the first aspect, after the sending, by the eUICC, the capability information of the terminal to a subscription management SM platform, the method further includes:

receiving, by the eUICC, a profile activation indication sent by the SM platform, where the activation indication includes a storage location identifier of a to-be-activated profile on the eUICC; and checking, by the eUICC according to the locally saved capability information of the terminal, whether to respond to the profile activation indication.

According to the first aspect or the first, the second, or the third possible implementation manner of the first aspect, in a fourth possible implementation manner of the first aspect, the capability information of the terminal includes one or more of the following: a type of a radio access technology RAT supported by the terminal, a concurrent working capability of a radio access technology supported by the terminal, type information of the terminal, whether the terminal supports a packet switched PS domain service, and whether the terminal supports a circuit switched CS domain service.

According to the first aspect or the first, the second, or the third possible implementation manner of the first aspect, in a fifth possible implementation manner of the first aspect, the SM platform includes one or both of the following:

a subscription manager-secure routing SM-SR and a subscription manager-data preparing SM-DP.

A second aspect of the embodiments of the present invention provides an eUICC management method, including:

receiving, by an SM platform, capability information that is sent by a first eUICC and that is of a first terminal in which the first eUICC is embedded; and managing, by the SM platform, a profile on the first eUICC or generating a profile or managing the first eUICC according to the capability information of the first terminal.

According to the second aspect, in a first possible implementation manner of the second aspect, after the receiving, by an SM platform, capability information that is sent by a first eUICC and that is of a first terminal in which the first eUICC is embedded, the method further includes:

updating, by the SM platform, the capability information of the first terminal to an eUICC information set EIS of the first eUICC; and accordingly, the managing, by the SM platform, a profile on the first eUICC or generating a profile or managing the first eUICC according to the capability information of the first terminal includes:

managing, by the SM platform, the profile on the first eUICC or generating a profile or managing the first eUICC according to the updated EIS.

According to the second aspect or the first possible implementation manner of the second aspect, in a second possible implementation manner of the second aspect, the capability information of the first terminal includes one or more of the following: a type of a radio access technology RAT supported by the first terminal, a concurrent working capability of a radio access technology supported by the first terminal, type information of the first terminal, whether the first terminal supports a packet switched PS domain service, and whether the first terminal supports a circuit switched CS domain service.

According to the second possible implementation manner of the second aspect, in a third possible implementation manner of the second aspect, the SM platform includes one or both of the following:

a subscription manager-secure routing SM-SR and a subscription manager-data preparing SM-DP.

According to the third possible implementation manner of the second aspect, in a fourth possible implementation manner of the second aspect, the managing, by the SM platform, a profile on the first eUICC according to the capability information of the first terminal includes:

receiving, by the SM-SR, a profile download request, where the download request includes an identifier of a to-be-downloaded profile and an identifier of the first eUICC; and sending, by the SM-SR, the capability information of the first terminal to the SM-DP, so that the SM-DP checks, according to the capability information of the first terminal, whether execution of the profile download request is allowed.

According to the fourth possible implementation manner of the second aspect, in a fifth possible implementation manner of the second aspect, the sending, by the SM-SR, the capability information of the first terminal to the SM-DP, so that the SM-DP checks, according to the capability information of the first terminal, whether execution of the profile download request is allowed includes:

sending, by the SM-SR, the capability information of the first terminal to the SM-DP, so that the SM-DP checks whether the to-be-downloaded profile is compatible with the type of the radio access technology RAT supported by the first terminal.

According to the third possible implementation manner of the second aspect, in a sixth possible implementation manner of the second aspect, the managing, by the SM platform, a profile on the first eUICC according to the capability information of the first terminal includes:

receiving, by the SM-SR, a profile activation request, where the activation request includes an identifier of the first eUICC and an identifier of a to-be-activated profile on the first eUICC; and checking, by the SM-SR according to the capability information of the first terminal, whether execution of the activation request is allowed.

According to the sixth possible implementation manner of the second aspect, in a seventh possible implementation manner of the second aspect, the checking, by the SM-SR according to the capability information of the first terminal, whether execution of the activation request is allowed includes:

checking, by the SM-SR, whether the to-be-activated profile is compatible with the concurrent working capability of the radio access technology supported by the first terminal.

According to the third possible implementation manner of the second aspect, in an eighth possible implementation manner of the second aspect, the managing, by the SM platform, a profile on the first eUICC according to the capability information of the first terminal includes:

receiving, by the SM-SR, a profile transport request sent by the first eUICC, where the transport request includes an identifier of the first terminal, an identifier of the first eUICC, an identifier of a second terminal, an identifier of a second eUICC, and an identifier of a to-be-transported profile, the second eUICC is embedded in the second terminal, and the transport request is used to request to transport user subscription information in the to-be-transported profile on the second eUICC to the first eUICC; and performing, by the SM-SR, compatibility check on the to-be-transported profile according to the capability information of the first terminal, and processing the transport request according to a compatibility check result.

According to the eighth possible implementation manner of the second aspect, in a ninth possible implementation manner of the second aspect, the processing, by the SM-SR, the transport request according to a check result includes:

if the to-be-transported profile does not pass compatibility check, sending, by the SM-SR, a modification indication to the SM-DP, where the modification indication includes the identifier of the first terminal, the identifier of the first eUICC, and the capability information of the first terminal, so that the SM-DP locally acquires a to-be-modified profile corresponding to the capability information of the first terminal, modifies, according to the modification indication, the to-be-modified profile to obtain a target profile, and sends the target profile to the SM-SR.

According to the third possible implementation manner of the second aspect, in a tenth possible implementation manner of the second aspect, the generating, by the SM platform, a profile according to the capability information of the first terminal includes:

sending, by the SM-SR, the capability information of the first terminal to the SM-DP, so that the SM-DP generates a profile according to obtained subscription data and the capability information of the first terminal.

According to the third possible implementation manner of the second aspect, in an eleventh possible implementation manner of the second aspect, the managing, by the SM platform, the first eUICC according to the capability information of the first terminal includes:

generating or updating, by the SM-SR, a management policy rule for the first eUICC according to the capability information of the first terminal.

A third aspect of the embodiments of the present invention provides an eUICC, including:

an acquiring module, configured to acquire capability information of a terminal in which the eUICC is embedded; and a sending module, configured to send the capability information of the terminal to an SM platform, so that the SM platform manages a configuration file profile on the eUICC or generates a profile or manages the eUICC according to the capability information of the terminal.

According to the third aspect, in a first possible implementation manner of the third aspect, the sending module is specifically configured to:

send the capability information of the terminal to the SM platform, so that the SM platform updates the capability information of the terminal to an eUICC information set EIS of the eUICC, and manages the profile on the eUICC or generates a profile or manages the eUICC according to the updated EIS.

According to the third aspect or the first possible implementation manner of the third aspect, in a second possible implementation manner of the third aspect, the eUICC further includes:

a storage module, configured to locally save the capability information of the terminal.

According to the second possible implementation manner of the third aspect, in a third possible implementation manner of the third aspect, the eUICC further includes:

a receiving module, configured to receive a profile activation indication sent by the SM platform, where the activation indication includes a storage location identifier of a to-be-activated profile on the eUICC; and a check module, configured to check, according to the locally saved capability information of the terminal, whether to respond to the profile activation indication.

According to the third aspect or the first, the second, or the third possible implementation manner of the third aspect, in a fourth possible implementation manner of the third aspect, the capability information of the terminal includes one or more of the following: a type of a radio access technology RAT supported by the terminal, a concurrent working capability of a radio access technology supported by the terminal, type information of the terminal, whether the terminal supports a packet switched PS domain service, and whether the terminal supports a circuit switched CS domain service.

According to the third aspect or the first, the second, or the third possible implementation manner of the third aspect, in a fifth possible implementation manner of the third aspect, the SM platform includes one or both of the following:

a subscription manager-secure routing SM-SR and a subscription manager-data preparing SM-DP.

A fourth aspect of the embodiments of the present invention provides an SM-SR, including:

a receiving module, configured to receive capability information that is sent by a first eUICC and that is of a first terminal in which the first eUICC is embedded; and a processing module, configured to manage a profile on the first eUICC or generate a profile or manage the first eUICC according to the capability information of the first terminal.

According to the fourth aspect, in a first possible implementation manner of the fourth aspect, the SM-SR further includes:

an update module, configured to update the capability information of the first terminal to an eUICC information set EIS of the first eUICC; and accordingly, the processing module is further configured to:

manage the profile on the first eUICC or generate the profile or manage the first eUICC according to the updated EIS.

According to the fourth aspect or the first possible implementation manner of the fourth aspect, in a second possible implementation manner of the fourth aspect, the capability information of the first terminal includes one or more of the following: a type of a radio access technology RAT supported by the first terminal, a concurrent working capability of a radio access technology supported by the first terminal, type information of the first terminal, whether the first terminal supports a packet switched PS domain service, and whether the first terminal supports a circuit switched CS domain service.

According to the second possible implementation manner of the fourth aspect, in a third possible implementation manner of the fourth aspect, the processing module includes:

a receiving unit, configured to receive a profile download request, where the download request includes an identifier of a to-be-downloaded profile and an identifier of the first eUICC; and a sending unit, configured to send the capability information of the first terminal to an SM-DP, so that the SM-DP checks, according to the capability information of the first terminal, whether execution of the profile download request is allowed.

According to the third possible implementation manner of the fourth aspect, in a fourth possible implementation manner of the fourth aspect, the receiving unit is further configured to:

receive a profile activation request, where the activation request includes the identifier of the first eUICC and an identifier of a to-be-activated profile on the first eUICC; and the SM-SR further includes:

a check module, configured to check, according to the capability information of the first terminal, whether execution of the activation request is allowed.

According to the fourth possible implementation manner of the fourth aspect, in a fifth possible implementation manner of the fourth aspect, the check module is specifically configured to:

check whether the to-be-activated profile is compatible with the concurrent working capability of the radio access technology supported by the first terminal.

According to the third possible implementation manner of the fourth aspect, in a sixth possible implementation manner of the fourth aspect, the receiving unit is further configured to:

receive a profile transport request sent by the first eUICC, where the transport request includes an identifier of the first terminal, the identifier of the first eUICC, an identifier of a second terminal, an identifier of a second eUICC, and an identifier of a to-be-transported profile, the second eUICC is embedded in the second terminal, and the transport request is used to request to transport user subscription information in the to-be-transported profile on the second eUICC to the first eUICC; and the check module is further configured to:

perform compatibility check on the to-be-transported profile according to the capability information of the first terminal.

According to the sixth possible implementation manner of the fourth aspect, in a seventh possible implementation manner of the fourth aspect, the sending unit is further configured to:

if the to-be-transported profile does not pass compatibility check, send a modification indication to the SM-DP, where the modification indication includes the identifier of the first terminal, the identifier of the first eUICC, and the capability information of the first terminal, so that the SM-DP locally acquires a to-be-modified profile corresponding to the capability information of the first terminal, and modifies, according to the modification indication, the to-be-modified profile to obtain a target profile.

A fifth aspect of the embodiments of the present invention provides an SM-DP, including:

a receiving module, configured to receive capability information that is sent by a first eUICC and that is of a first terminal in which the first eUICC is embedded; and a processing module, configured to manage a profile on the first eUICC or generate a profile or manage the first eUICC according to the capability information of the first terminal.

According to the fifth aspect, in a first possible implementation manner of the fifth aspect, the capability information of the first terminal includes one or more of the following: a type of a radio access technology RAT supported by the first terminal, a concurrent working capability of a radio access technology supported by the first terminal, type information of the first terminal, whether the first terminal supports a packet switched PS domain service, and whether the first terminal supports a circuit switched CS domain service.

According to the first possible implementation manner of the fifth aspect, in a second possible implementation manner of the fifth aspect, the SM-DP further includes:

a sending module, configured to send a profile download request to an SM-SR, where the download request includes an identifier of a to-be-downloaded profile and an identifier of the first eUICC;

the receiving module is further configured to receive the capability information of the first terminal that is returned by the SM-SR; and the SM-DP further includes:

a check module, configured to check, according to the capability information of the first terminal, whether execution of the profile download request is allowed.

According to the second possible implementation manner of the fifth aspect, in a third possible implementation manner of the fifth aspect, the check module is specifically configured to:

check whether the to-be-downloaded profile is compatible with the type of the radio access technology RAT supported by the first terminal.

According to the first possible implementation manner of the fifth aspect, in a fourth possible implementation manner of the fifth aspect, the receiving module is further configured to:

receive a modification indication sent by the SM-SR, where the modification indication includes an identifier of the first terminal, an identifier of the first eUICC, and the capability information of the first terminal; and the processing module is configured to:

acquire a to-be-modified profile corresponding to the capability information of the first terminal, and modify, according to the modification indication, the to-be-modified profile to obtain a target profile.

According to the first possible implementation manner of the fifth aspect, in a fifth possible implementation manner of the fifth aspect, the processing module is further configured to:

generate a profile according to obtained subscription data and the capability information of the first terminal.

A sixth aspect of the embodiments of the present invention provides a management system, including:

the embedded universal integrated circuit card eUICC according to any one of the third aspect and the possible implementation manners of the third aspect, the subscription manager-secure routing SM-SR according to any one of the fourth aspect and the possible implementation manners of the fourth aspect, and the subscription manager-data preparing SM-DP according to any one of the fifth aspect and the possible implementation manners of the fifth aspect.

A seventh aspect of the embodiments of the present invention provides an SM-SR, including:

a receiver, a memory, and a processor connected to the memory, where the memory is configured to store a group of program code, and the processor is configured to invoke the program code stored in the memory, to execute the eUICC management method according to any one of the second aspect and the possible implementation manners of the second aspect.

An eighth aspect of the embodiments of the present invention provides an SM-DP, including:

a receiver, a memory, and a processor connected to the memory, where the memory is configured to store a group of program code, and the processor is configured to invoke the program code stored in the memory, to execute the eUICC management method according to any one of the second aspect and the possible implementation manners of the second aspect.

A ninth aspect of the embodiments of the present invention provides an eUICC, including:

a transmitter, a memory, and a processor connected to the memory, where the memory is configured to store a group of program code, and the processor is configured to invoke the program code stored in the memory, to execute the eUICC management method according to any one of the first aspect and the possible implementation manners of the first aspect.

According to the eUICC management method, the eUICC, the SM platform, and the system provided in the embodiments of the present invention, after acquiring capability information of a terminal in which the eUICC is embedded, an eUICC sends the capability information of the terminal to an SM platform, so that the SM platform can manage a configuration file profile on the eUICC or generate a profile or manage the eUICC according to the capability information of the terminal. Capability information of a terminal in which the eUICC is embedded is reported to an SM platform, so that management performed on a configuration file and the like on an eUICC by the SM platform can match the capability information of the terminal, which improves processing accuracy.

DESCRIPTION OF EMBODIMENTS

The embodiments of the invention are described below with reference to the accompanying drawings.

Figure 1:
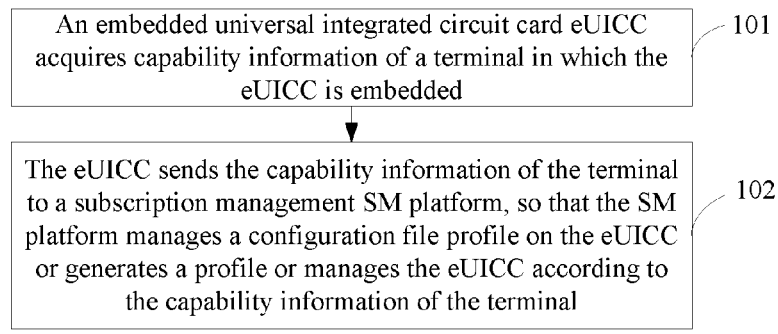
FIG. 1 is a flowchart of an eUICC management method according to Embodiment 1 of the present invention.

FIG. 1 is a flowchart of an eUICC management method according to Embodiment 1 of the present invention, and as shown in FIG. 1, the method includes:

Step 101: An embedded universal integrated circuit card eUICC acquires capability information of a terminal in which the eUICC is embedded.

Step 102: The eUICC sends the capability information of the terminal to a subscription management SM platform, so that the SM platform manages a configuration file profile on the eUICC or generates a profile or manages the eUICC according to the capability information of the terminal.

First, main functional entities involved in the following embodiments are explained. The SM platform includes one or both of the following: a subscription manager-secure routing SM-SR and a subscription manager-data preparing SM-DP. The SM-SR is configured to: implement secure routing of a configuration file (profile), and directly manage a profile on an eUICC, for example, perform a processing operation such as transmission, activation, deactivation, or transportation. The SM-DP is configured to generate a profile, where the profile is a general term for a series of files, data, and applications that are on an eUICC and are related to a mobile network operator (Mobile Network Operator, MNO for short). It should be noted that the SM-SR and the SM-DP may be disposed in integration, or may be disposed independently.

In the prior art, after eUICCs are delivered from a factory, an EUM performs registration of initial parameters of the eUICCs with corresponding SMs, and specifically, mainly performs registration with SM-SRs. The EUM cannot learn terminals in which the eUICCs produced by the EUM are subsequently embedded. Therefore, the EUM cannot provide, for the SMs, information related to the terminals in which the eUICCs are embedded, which may further cause various errors and problems in a profile processing procedure; for example, subscription information in a profile does not match a network access capability of a terminal, or a profile activation request is incompatible with a single-standby or multi-standby capability of a terminal.

To resolve the foregoing problem, in this embodiment, preferably, when being powered on and initialized, the terminal in which the eUICC is embedded sends the capability information of the terminal to the eUICC, where the capability information of the terminal includes one or more of the following: a type of a radio access technology (Radio Access Technology, RAT for short) supported by the terminal, a concurrent working capability of a radio access technology supported by the terminal, type information of the terminal, whether the terminal supports a packet switched PS domain service, and whether the terminal supports a circuit switched CS domain service. The type of the RAT includes, for example, a type of a radio access technology, such as the GSM, the GPRS, the CDMA, or the WCDMA; a terminal type includes, for example, an H2H (Human to Human) terminal, such as a mobile phone or a tablet computer, involved in interpersonal communication, and further includes an M2M (Machine to Machine) device involved in communication between machines; the concurrent working capability of the radio access technology of the terminal includes, for example, a quantity of profiles that can be supported to be on standby at the same time.

It may be understood that, it may further be set that the terminal in which the eUICC is embedded periodically sends the capability information of the terminal to the eUICC, or the eUICC actively requests to acquire the capability information of the terminal in which the eUICC is embedded from the terminal in which the eUICC is embedded. The following describes an example in which the terminal actively sends the capability information of the terminal to the eUICC in the terminal after being powered on.

After the eUICC receives the capability information that is of the terminal in which the eUICC is embedded and that is sent by the terminal after the terminal is powered on, the eUICC sends the capability information of the terminal to the SM platform, so that the SM platform manages the configuration file profile on the eUICC or generates a profile or manages the eUICC according to the capability information of the terminal.

Optionally, in this embodiment, the eUICC may send, to the SM platform, the capability information of the terminal in which the eUICC is embedded, and may further send current status information of the eUICC to the SM platform. The current status information includes, for example, current available storage space and a status of each profile inside the eUICC such as an active state or an inactive state. Therefore, the SM platform may further manage the configuration file profile on the eUICC or generate a profile or manage the eUICC according to the capability information of the terminal and the current status information of the eUICC.

Further optionally, after receiving the capability information that is of the terminal in which the eUICC is embedded and that is sent by the eUICC, and the optionally included current status information of the eUICC, the SM platform further updates the capability information of the terminal and the optionally included current status information of the eUICC to an eUICC information set EIS of the eUICC, and manages the profile on the eUICC or generates a profile or manages the eUICC according to the updated EIS. That is, the updated EIS is used in a subsequent procedure such as downloading or activation of the eUICC and the profile on the eUICC. Therefore, in a process of managing the profile on the eUICC or generating a profile or managing the eUICC, the capability information of the terminal in which the eUICC is embedded and the current status information of the eUICC are used as a basis, which further improves processing accuracy.

Further, after that an embedded universal integrated circuit card eUICC acquires capability information of a terminal in which the eUICC is embedded, the method further includes:

locally saving, by the eUICC, the capability information of the terminal.

In this embodiment, the eUICC locally saves the capability information of the terminal mainly because the eUICC may not be absolutely synchronized with the SM platform. In this manner, in a process in which the SM platform manages the eUICC and the profile on the eUICC, the eUICC can locally determine feasibility of a management operation.

The following describes a process of interaction between the eUICC and the SM platform in detail, where interaction between the SM-SR and the eUICC is mainly used as an example for description; and uses an example in which the SM-SR updates the EIS of the eUICC after receiving the capability information of the terminal that is sent by the eUICC. It may be understood that corresponding processing may be directly performed without updating the EIS.

In an existing EUM registration procedure, an SM-SR already stores an eUICC information set EIS of an eUICC corresponding to the SM-SR. Therefore, in this embodiment, after receiving capability information of a terminal that is sent by an eUICC, an SM-SR updates an eUICC information set EIS of the eUICC according to the capability information of the terminal, for example, adds the capability information of the terminal to the EIS. Optionally, if current status information of the eUICC is obtained, a status of each profile in the EIS, a memory usage situation of the eUICC, and the like are further updated. The updated EIS is used in a subsequent procedure such as downloading or activation of a configuration file on the eUICC. It should be noted that there is a particular correspondence and association relationship between an SM-SR and an eUICC, that is, an SM-SR is in charge of management of each eUICC that is correspondingly associated with the SM-SR; acquiring of the correspondence and association relationship is regulated in the prior art, and details are not described in this embodiment.

In this embodiment, after acquiring capability information of a terminal in which the eUICC is embedded, an eUICC sends the capability information of the terminal to an SM-SR, so that the SM-SR manages a configuration file profile on the eUICC or generates a profile or manages the eUICC according to the capability information of the terminal. Capability information of a terminal in which the eUICC is embedded is reported to an SM-SR, so that management performed on a configuration file and the like on an eUICC by the SM-SR can match the capability information of the terminal, which improves processing accuracy.

Figure 2:
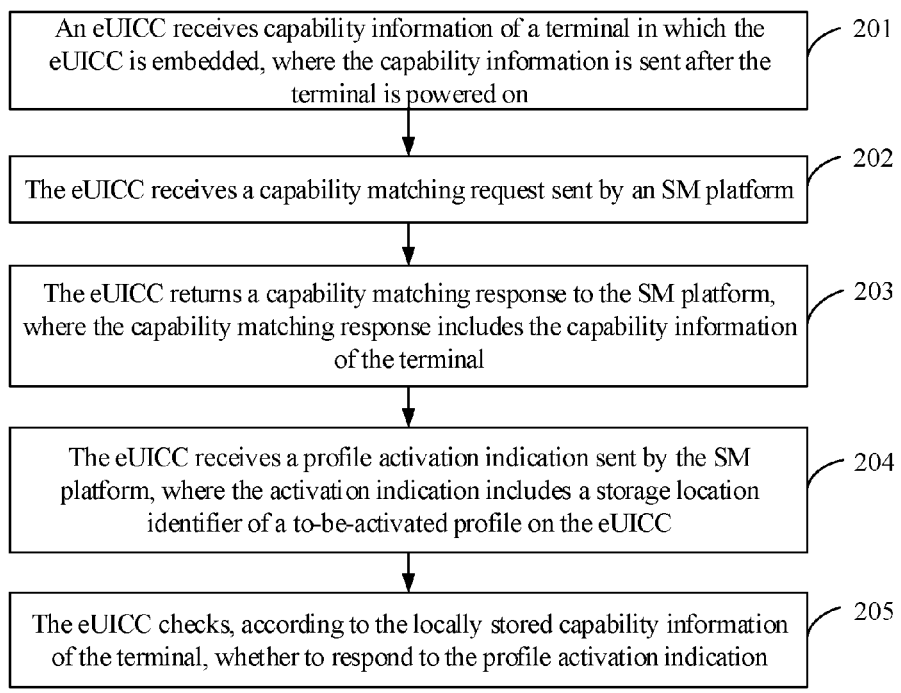
FIG. 2 is a flowchart of an eUICC management method according to Embodiment 2 of the present invention.

FIG. 2 is a flowchart of an eUICC management method according to Embodiment 2 of the present invention, and as shown in FIG. 2, the method includes:

Step 201: An eUICC receives capability information of a terminal in which the eUICC is embedded, where the capability information is sent by the terminal after the terminal is powered on.

In this embodiment, the eUICC sends the capability information of the terminal to an SM platform in the following manner:

Step 202: The eUICC receives a capability matching request sent by an SM platform.

Step 203: The eUICC returns a capability matching response to the SM platform, where the capability matching response includes the capability information of the terminal.

Step 204: The eUICC receives a profile activation indication sent by the SM platform, where the activation indication includes a storage location identifier of a to-be-activated profile on the eUICC.

Step 205: The eUICC checks, according to the locally saved capability information of the terminal, whether to respond to the profile activation indication.

The following still uses interaction between the eUICC and an SM-SR in the SM platform as an example. It should be noted that, in an actual application, the eUICC can learn the SM-SR that is correspondingly associated with the eUICC. Therefore, after receiving the capability information of the terminal, the eUICC first establishes a secure IP connection with the corresponding SM-SR, and after the connection is established, receives the capability matching request sent by the SM-SR, and makes a response.

In this case, the eUICC already sends the capability information of the terminal in which the eUICC is embedded and optionally included current status information of the eUICC to the corresponding SM-SR, so that the SM-SR can update an EIS of the eUICC. The following uses an example in which the SM-SR activates a to-be-activated profile on the eUICC, to describe use of the capability information of the terminal.

A file, data, and an application that are related to a mobile network operator MNO are stored in the profile. Therefore, when the profile of the MNO is downloaded to the eUICC, the eUICC can use the profile only when an activation procedure is completed.

In this embodiment, according to a general actual application case, optionally, generally the MNO sends a profile activation request to an SM-DP to trigger an activation processing procedure, where the SM-DP may be preferably disposed in a management entity device on an MNO side, or the SM-DP and the SM-SR may be disposed in integration. The profile activation request sent by the MNO to the SM-DP includes an identifier of the eUICC and an identifier of the to-be-activated profile on the eUICC, that is, the SM-DP is notified of a profile that is on an eUICC and that needs to be activated. The activation request further includes an identifier of the SM-SR, which is used to notify the SM-DP of an SM-SR with which the SM-DP is to interact, to perform a subsequent activation processing procedure. The SM-DP identifies the identifier of the SM-SR that is included in the activation request, and performs bidirectional authentication with the corresponding SM-SR, that is, authentication on identity validity of the SM-DP and the SM-SR. After the authentication succeeds, the SM-DP forwards the activation request to the corresponding SM-SR. Optionally, the MNO may directly send a profile activation request to the SM-SR.

In one manner, after performing the foregoing operation of updating the EIS, the SM-SR may perform the following processing according to the updated EIS. The SM-SR finds, from a locally saved database according to the identifier of the eUICC that is included in the activation request, the updated EIS corresponding to the identifier of the eUICC, performs, according to the updated EIS, compatibility check on the to-be-activated profile corresponding to the identifier of the to-be-activated profile, and when the to-be-activated profile passes compatibility check, sends an activation indication that includes a storage location identifier of the to-be-activated profile to the eUICC, so that the eUICC determines the to-be-activated profile according to the storage location identifier, and activates the to-be-activated profile. In another manner, the SM-SR does not update the EIS, but instead, locally saves the capability information of the terminal in which the eUICC is embedded. In this case, after the activation request is received, it is directly checked whether execution of the activation request is allowed, for example, it is checked whether the to-be-activated profile is compatible with a concurrent working capability of a radio access technology supported by the terminal. The activation indication is delivered when execution of the activation request is allowed by means of checking.

Preferably, after receiving the activation indication, the eUICC further checks, according to the locally saved capability information of the terminal, whether to respond to the profile activation indication, for example, checks whether the to-be-activated profile is compatible with the concurrent working capability of the radio access technology supported by the terminal, which is equivalent to locally performing check once again, so that a management defect caused by unsynchronization between the eUICC and the SM platform is avoided.

In this embodiment, the SM-SR performs compatibility check on the to-be-activated profile on the eUICC according to the updated EIS corresponding to the identifier of the eUICC. For example, if the capability information of the terminal in the EIS indicates that the terminal can support only dual-standby, that is, can support only a case in which two profiles are in an active state at the same time, but the eUICC supports multi-standby, for example, supports a case in which three profiles are in an active state at the same time, or if the current status information of the eUICC in the EIS indicates, if the SM-SR further performs compatibility check according to the current status information of the eUICC and according to the EIS of the eUICC, that available storage space is insufficient or activation of the to-be-activated profile is not allowed, it is considered that the to-be-activated profile cannot pass compatibility check, and in this case, the SM-SR returns a compatibility conflict notification to the SM-DP, so as to provide an error prompt. If the to-be-activated profile passes compatibility check, the SM-SR sends the activation indication that includes the storage location identifier of the to-be-activated profile to the eUICC.

Further, the following embodiment uses an example in which the SM platform generates a profile according to the capability information of the terminal in which the eUICC is embedded that is sent by the eUICC, to describe use of the capability information of the terminal.

In order that an eUICC can properly use a network of an MNO, a corresponding profile needs to be generated on the eUICC. Generally, generation of a profile is implemented by an SM-DP. Therefore, after an SM-SR receives capability information of a terminal that is sent by the eUICC, the SM-SR sends the capability information of the terminal to the SM-DP, so that the SM-DP generates a profile according to obtained subscription data and the capability information of the terminal. It may be understood that the SM-DP already obtains subscription data of an end user from the MNO in advance.

Further, the following embodiment uses an example in which the SM platform manages the eUICC according to the capability information of the terminal in which the eUICC is embedded that is sent by the eUICC, to describe use of the capability information of the terminal.

After receiving the foregoing capability information of the terminal, the SM-SR generates a management policy rule for the eUICC according to the capability information of the terminal, and may further deliver the management policy rule to the eUICC, so that in a subsequent management process of the profile on the eUICC, for example, during compatibility check, further check may be performed according to the management policy rule.

In the foregoing embodiment, after receiving capability information of a terminal in which the eUICC is embedded, where the capability information is sent by the terminal after the terminal is powered on, each eUICC sends the capability information of the terminal to an SM-SR, so that the SM-SR can update an eUICC information set EIS of each eUICC according to the capability information of the terminal, and manage a profile on the eUICC or generate a profile or manage the eUICC according to the updated EIS. In addition, in a management process, compatibility of a configuration file is determined based on the capability information of the terminal, which is helpful in avoiding a case in which a to-be-processed configuration file does not match a capability of the terminal, so that it is ensured that the terminal functions properly, and processing efficiency is improved.

Figure 3:
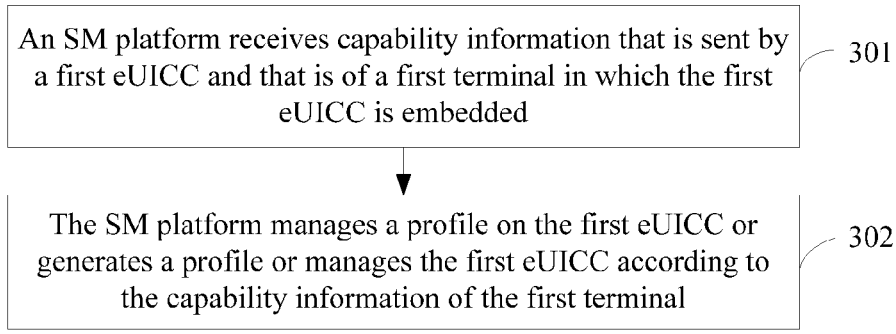
FIG. 3 is a flowchart of an eUICC management method according to Embodiment 3 of the present invention.

FIG. 3 is a flowchart of an eUICC management method according to Embodiment 3 of the present invention, and as shown in FIG. 3, the method includes:

Step 301: An SM platform receives capability information that is sent by a first eUICC and that is of a first terminal in which the first eUICC is embedded.

Step 302: The SM platform manages a profile on the first eUICC or generates a profile or manages the first eUICC according to the capability information of the first terminal.

In the following embodiment, the foregoing steps 301 and 302 are described in detail by dividing the SM platform into an SM-SR and an SM-DP.

In the prior art, after eUICCs are delivered from a factory, an EUM performs registration of factory defaults of the eUICCs with corresponding SM-SRs, that is, in the prior art, an SM-SR stores only an EIS that includes an initial configuration of each eUICC corresponding to the SM-SR.

In this embodiment, an eUICC is a card that is embedded in a terminal and that cannot be inserted or removed. Therefore, preferably, when the terminal in which the eUICC is embedded is powered on and initialized, a process in which the terminal sends capability information of the terminal to the eUICC in the terminal is triggered; or optionally, the eUICC may actively send a request to the terminal in which the eUICC is embedded, to obtain capability information of the terminal. The former case is used as an example. That is, when being powered on and initialized, terminals in which eUICCs, that is, the first eUICC in this embodiment and a second eUICC in a subsequent embodiment, are embedded send capability information of the terminals to the eUICCs. The capability information of the first terminal includes one or more of the following: a type of a radio access technology RAT supported by the first terminal, a concurrent working capability of a radio access technology supported by the first terminal, type information of the first terminal, whether the first terminal supports a packet switched PS domain service, and whether the first terminal supports a circuit switched CS domain service. It should be noted that the first eUICC and the second eUICC are respectively embedded in different terminals, that is, the first eUICC receives the capability information of the first terminal in which the first eUICC is embedded, where capability the information is sent by the first terminal after the first terminal is powered on, and the second eUICC receives capability information of a second terminal in which the second eUICC is embedded, where the capability information is sent by the second terminal after the second terminal is powered on.

The following provides a description by using the first eUICC as an object.

In this embodiment, after that an SM platform receives capability information that is sent by a first eUICC and that is of a first terminal in which the first eUICC is embedded, the method further includes:

updating, by the SM platform, the capability information of the first terminal to an eUICC information set EIS of the first eUICC; and accordingly, that the SM platform manages a profile on the first eUICC or generates a profile or manages the first eUICC according to the capability information of the first terminal includes:

managing, by the SM platform, the profile on the first eUICC or generating a profile or managing the first eUICC according to the updated EIS.

After the first eUICC receives the capability information of the first terminal in which the first eUICC is embedded, where the capability information is sent by the first terminal after the first terminal is powered on, the first eUICC sends the capability information to the corresponding SM-SR, and optionally, also sends current status information of the first eUICC to the SM-SR. Therefore, the SM-SR may manage the profile on the first eUICC or generate a profile or manage the first eUICC according to the capability information of the first terminal or the optionally included current status information; or optionally, therefore, the SM-SR may update the eUICC information set EIS of the first eUICC according to the capability information of the first terminal or the optionally included current status information, and manage the profile on the first eUICC or generate a profile or manage the first eUICC according to the updated EIS.

In this embodiment, the current status information of the first eUICC includes, for example, current available storage space and a status of each profile inside the first eUICC such as an active state or an inactive state.

It should be noted that there is a particular correspondence and association relationship between an SM-SR and an eUICC, that is, an SM-SR is in charge of management of each eUICC that is correspondingly associated with the SM-SR;

acquiring of the correspondence and association relationship is regulated in the prior art, and details are not described in this embodiment.

In this embodiment, an SM-SR updates an eUICC information set EIS of an eUICC according to capability information that is acquired by the eUICC and that is of a terminal in which the eUICC is embedded, and performs processing such as downloading, activation, or transportation on a configuration file on the eUICC according to the updated EIS, so that the processing of the SM-SR can match the capability information of the terminal, which is helpful in improving processing accuracy and processing efficiency.

Specifically, in step 301, that an SM platform receives capability information that is sent by a first eUICC and that is of a first terminal in which the first eUICC is embedded may be specifically implemented in the following manner:

sending, by the SM-SR, a capability matching request to the first eUICC; and receiving, by the SM-SR, a capability matching response returned by the first eUICC, where the capability matching response includes the capability information of the first terminal.

It should be noted that, in an actual application, the first eUICC can learn the SM-SR that is correspondingly associated with the first eUICC. Therefore, after receiving the capability information of the first terminal, the first eUICC first establishes a secure IP connection with the corresponding SM-SR, and after establishment of the connection is completed, the SM-SR sends the capability matching request to the first eUICC, so that the first eUICC responds to the capability matching request, adds the capability information of the first terminal to the capability matching response, and optionally, may further add the current status information of the first eUICC.

Optionally, in step 302, that the SM platform manages a profile on the first eUICC according to the capability information of the first terminal includes:

receiving, by the SM-SR, a profile download request sent by an MNO by using the SM-DP, where the download request includes an identifier of a to-be-downloaded profile and an identifier of the first eUICC;

acquiring, by the SM-SR, the capability information that is of the first terminal and that is corresponding to the identifier of the first eUICC, and sending the capability information of the first terminal to the SM-DP, so that the SM-DP checks, according to the capability information of the first terminal, whether execution of the profile download request is allowed; and forwarding, by the SM-SR to the first eUICC, a profile download indication that is sent by the SM-DP after the SM-DP determines, according to the capability information of the first terminal, execution of the profile download request is allowed, where the profile download indication includes the to-be-downloaded profile, so that the first eUICC downloads the to-be-downloaded profile according to the download indication.

In this embodiment, first, a configuration file profile download process is used as an example to describe how the SM-SR manages the profile on the first eUICC according to the capability information of the first terminal in which the first eUICC is embedded.

When an MNO needs to download a profile to the first eUICC, the MNO first sends a profile download request to the SM-DP, where the download request includes an identifier of the to-be-downloaded profile and the identifier of the first eUICC, and optionally, further includes an identifier of the SM-SR. After determining the corresponding SM-SR according to the identifier of the SM-SR, the SM-DP sends an acquiring request that includes the identifier of the first eUICC to the SM-SR, so that the SM-SR acquires the capability information of the first terminal in which the first eUICC is embedded. Optionally, after updating the EIS of the first eUICC according to the capability information of the first terminal, the SM-SR may return the updated EIS to the SM-DP. The latter is used as an example for description. Because the updated EIS includes the capability information of the first terminal in which the first eUICC is embedded, and optionally, further includes the status information of the first eUICC, after determining, according to the updated EIS, that the to-be-downloaded profile corresponding to the identifier of the to-be-downloaded profile passes compatibility check, that is, execution of the profile download request is allowed, the SM-DP may send, to the first eUICC by using the SM-SR, a download indication that carries the to-be-downloaded profile, so that the first eUICC downloads the to-be-downloaded profile according to the download indication.

That the SM-DP checks, according to the capability information of the first terminal, whether execution of the profile download request is allowed includes: checking, by the SM-DP, whether the to-be-downloaded profile is compatible with the type of the radio access technology RAT supported by the first terminal.

Optionally, it may be determined, in the following manner, whether the to-be-downloaded profile can pass compatibility check, which includes, for example, determining, according to the status information of the first eUICC, whether the first eUICC is qualified, and determining whether content of the to-be-downloaded profile matches the capability information of the first terminal. For example, if the status information of the first eUICC indicates that storage space of the first eUICC is insufficient, it is considered that the first eUICC is not qualified, or if the to-be-downloaded profile subscribes to a 4G network, but the first terminal is a 3G terminal, it is considered that the to-be-downloaded profile does not match the capability information of the first terminal. Therefore, the to-be-downloaded profile does not pass compatibility check, and the SM-DP sends a compatibility conflict notification to each of the MNO and the SM-SR. On the contrary, the to-be-downloaded profile passes compatibility check, and the profile download process continues.

Further optionally, in step 302, that the SM platform manages a profile on the first eUICC according to the capability information of the first terminal includes:

receiving, by the SM-SR, a profile activation request sent by an MNO, where the activation request includes an identifier of the first eUICC and an identifier of a to-be-activated profile on the first eUICC; and checking, by the SM-SR according to the capability information that is of the first terminal and that is corresponding to the identifier of the first eUICC, whether execution of the activation request is allowed.

The checking, by the SM-SR according to the capability information of the first terminal, whether execution of the activation request is allowed includes:

checking, by the SM-SR, whether the to-be-activated profile is compatible with the concurrent working capability of the radio access technology supported by the first terminal.

If the to-be-activated profile passes compatibility check, the SM-SR sends a profile activation indication to the first eUICC, where the activation indication includes a storage location identifier of the to-be-activated profile, so that the first eUICC determines the to-be-activated profile according to the storage location identifier, and activates the to-be-activated profile, or so that the first eUICC checks, according to the locally saved capability information of the first terminal, whether execution of the activation indication is allowed.

Further, in this embodiment, then, a profile activation process is used as an example to further describe how the SM-SR processes the profile on the first eUICC according to the updated EIS of the first eUICC.

A file, data, and an application that are related to the mobile network operator MNO are stored in a profile. Therefore, when the profile of the MNO is downloaded to the first eUICC, the first eUICC can use the profile only when an activation procedure is completed.

Therefore, generally, the MNO triggers an activation processing procedure by sending a profile activation request to the SM-DP. The profile activation request sent by the MNO to the SM-DP includes the identifier of the first eUICC and an identifier of the to-be-activated profile on the first eUICC, that is, the SM-DP is notified of a profile that is on an eUICC and that needs to be activated. The activation request further includes an identifier of the SM-SR, which is used to notify the SM-DP of an SM-SR with which the SM-DP is to interact, to perform a subsequent activation processing procedure. The SM-DP identifies the identifier of the SM-SR that is included in the activation request, and performs bidirectional authentication with the corresponding SM-SR, that is, authentication on identity validity of the SM-DP and the SM-SR. After the authentication succeeds, the SM-DP forwards the activation request to the corresponding SM-SR. Optionally, the MNO may directly send a profile activation request to the SM-SR.

The SM-SR finds, from a locally saved database according to the identifier of the first eUICC that is included in the activation request, the updated EIS corresponding to the identifier of the first eUICC, determines, according to the updated EIS, whether the to-be-activated profile corresponding to the identifier of the to-be-activated profile passes compatibility check, and when the to-be-activated profile passes compatibility check, sends an activation indication that includes a storage location identifier of the to-be-activated profile to the first eUICC, so that the first eUICC determines the to-be-activated profile according to the storage location identifier, and activates the to-be-activated profile.

In this embodiment, when the SM-SR updates the EIS of the first eUICC according to the capability information of the first terminal in which the first eUICC is embedded and the current status information of the first eUICC, that the SM-SR determines, according to the updated EIS corresponding to the identifier of the first eUICC, whether the to-be-activated profile passes compatibility check may include:

determining, by the SM-SR according to the capability information of the first terminal in the updated EIS corresponding to the identifier of the first eUICC, whether the to-be-activated profile matches the first terminal, and if the to-be-activated profile matches the first terminal, determining, by the SM-SR according to the current status information of the first eUICC in the updated EIS corresponding to the identifier of the first eUICC, whether activation of the to-be-activated profile is allowed. For example, if the current status information of the first eUICC in the EIS indicates that available storage space is insufficient, it is determined that activation of the to-be-activated profile is not allowed; if the capability information of the first terminal in the EIS indicates that the first terminal supports only dual-standby, that is, supports a case in which only two profiles are in an active state at the same time, but the first eUICC supports multi-standby, for example, supports a case in which three profiles are in an active state at the same time, it is considered that the first eUICC is incompatible with the first terminal; in this case, it is considered that the to-be-activated profile cannot pass compatibility check, and the SM-SR returns a compatibility conflict notification to the SM-DP, to provide an error prompt. If the to-be-activated profile passes compatibility check, the SM-SR forwards the activation request that includes the storage location identifier of the to-be-activated profile to the first eUICC, so that the first eUICC determines the to-be-activated profile according to the storage location identifier, and activates the to-be-activated profile.

The following uses a profile transport process as an example to further describe how the SM-SR manages the profile on the first eUICC according to the updated EIS of the first eUICC.

In the following embodiment, an example in which the SM-SR transports a to-be-transported profile on the second eUICC to the first eUICC is used to further describe use of an updated EIS. It should be noted that, in this embodiment, it is assumed that a same SM-SR manages the first eUICC and the second eUICC, and the SM-SR stores the updated EIS corresponding to the first eUICC and an updated EIS corresponding to the second eUICC. In addition, the first eUICC is embedded in the first terminal, the second eUICC is embedded in the second terminal, and the first terminal and the second terminal are generally different terminals of a same user. To transport the to-be-transported profile on the second eUICC in the second terminal to the first eUICC in the first terminal, further optionally, in step 302, that the SM platform manages a profile on the first eUICC according to the capability information of the first terminal includes:

receiving, by the SM-SR, a profile transport request sent by the first eUICC, where the transport request includes an identifier of the first terminal, an identifier of the first eUICC, an identifier of the second terminal, an identifier of the second eUICC, and an identifier of the to-be-transported profile, the second eUICC is embedded in the second terminal, and the transport request is used to request to transport user subscription information in the to-be-transported profile on the second eUICC to the first eUICC; and performing, by the SM-SR, compatibility check on the to-be-transported profile according to the updated EIS corresponding to the identifier of the first eUICC, and processing the transport request according to a compatibility check result.

Compatibility check is similar to that in the foregoing activation process and download process, and is not described again. The processing, by the SM-SR, the transport request according to a compatibility check result includes the following two cases:

First, if the to-be-transported profile passes compatibility check, the SM-SR sends a first modification indication to the SM-DP, where the first modification indication includes the identifier of the first terminal, the identifier of the first eUICC, and the identifier of the to-be-transported profile, so that the SM-DP modifies, according to the first modification indication, the to-be-transported profile to obtain a target profile, and sends the target profile to the SM-SR.

The SM-SR returns a transport response to the first eUICC, where the transport response includes the target profile.

Second, if the to-be-transported profile does not pass compatibility check, the SM-SR sends a second modification indication to the SM-DP, where the second modification indication includes the identifier of the first terminal, the identifier of the first eUICC, and the capability information of the first terminal, so that the SM-DP locally acquires a to-be-modified profile corresponding to the capability information of the first terminal, modifies, according to the second modification indication, the to-be-modified profile to obtain a target profile, and sends the target profile to the SM-SR.

Optionally, the first eUICC sends the profile transport request to the corresponding SM-SR. Optionally, after receiving the profile transport request, the SM-SR may acquire, according to the identifier of the second eUICC that is included in the request, personalized data information, such as interests and preferences and a usage record, that is of the user and that is included in the second eUICC. Afterward, the SM-SR locally acquires, according to the identifier of the first eUICC that is included in the transport request, the updated EIS corresponding to the identifier of the first eUICC, and determines, according to the capability information of the first terminal and/or the current status information of the first eUICC that is included in the EIS, whether the to-be-transported profile can pass compatibility check.

If the to-be-transported profile passes compatibility check, the SM-SR sends the first modification indication to the SM-DP, where the first modification indication includes the identifier of the first terminal, the identifier of the first eUICC, and the identifier of the to-be-transported profile, so that the SM-DP respectively changes the identifier of the second terminal and the identifier of the second eUICC that are in the user subscription information in the to-be-transported profile to the identifier of the first terminal and the identifier of the first eUICC, to obtain the target profile, and sends the target profile to the SM-SR. The SM-SR returns the transport response to the first eUICC, and then, the first eUICC activates the target profile, to access a network of an MNO.

Optionally, generally, in an actual application, to further ensure that subsequently, the first eUICC functions properly, after determining that the to-be-transported profile passes compatibility check, the SM-SR further sends, to the MNO, another modification indication that carries the identifier of the first terminal and the identifier of the first eUICC, so that the MNO changes, to the identifier of the first terminal and the identifier of the first eUICC, an identifier of a terminal and an identifier of an eUICC that are in locally saved user subscription information and that are corresponding to the identifier of the second terminal and the identifier of the second eUICC.

On the other hand, if the to-be-transported profile does not pass compatibility check, the SM-SR sends the second modification indication to the SM-DP, where the second modification indication includes the identifier of the first terminal, the identifier of the first eUICC, and the capability information of the first terminal, so that the SM-DP locally acquires the to-be-modified profile corresponding to the capability information of the first terminal, modifies, according to the identifier of the first terminal and the identifier of the first eUICC, the to-be-modified profile to obtain the target profile, and sends the target profile to the SM-SR. The SM-SR returns the transport response to the first eUICC, and then, the first eUICC activates the target profile, to access a network of an MNO.

Accordingly, optionally, to further ensure that subsequently, the first eUICC functions properly, after determining that the to-be-transported profile does not pass compatibility check, the SM-SR further sends, to the MNO, another modification indication that carries the identifier of the first terminal, the identifier of the first eUICC, and the capability information of the first terminal, so that the MNO locally searches for user subscription information that matches the capability information of the first terminal, and modifies, to the identifier of the first terminal and the identifier of the first eUICC, an identifier of a terminal and an identifier of an eUICC that are in the user subscription information.

Further optionally, in step 302, that the SM platform generates a profile according to the capability information of the first terminal includes:

sending, by the SM-SR, the capability information of the first terminal to the SM-DP, so that the SM-DP generates a profile according to obtained subscription data and the capability information of the first terminal.

In order that an eUICC can properly use a network of an MNO, a corresponding profile needs to be generated on the eUICC. Generally, generation of a profile is implemented by an SM-DP. Therefore, after an SM-SR receives capability information of a terminal that is sent by the eUICC, the SM-SR sends the capability information of the terminal to the SM-DP, so that the SM-DP generates a profile according to obtained subscription data and the capability information of the terminal. It may be understood that the SM-DP already obtains subscription data of an end user from the MNO in advance.

Further optionally, in step 302, that the SM platform manages the first eUICC according to the capability information of the first terminal includes:

generating or updating, by the SM-SR, a management policy rule for the first eUICC according to the capability information of the first terminal.

After receiving the foregoing capability information of the terminal, the SM-SR generates the management policy rule for the eUICC according to the capability information of the terminal, and may further deliver the management policy rule to the eUICC, so that in a subsequent management process of the profile on the eUICC, for example, during compatibility check, further check may be performed according to the management policy rule.

In the foregoing embodiment, after obtaining capability information of a terminal in which the eUICC is embedded, an eUICC sends the capability information of the terminal, and optionally, current status information of the eUICC to a corresponding SM-SR, so that the SM-SR can update an eUICC information set EIS of the eUICC according to the capability information of the terminal and the current status information, and perform processing such as downloading, activation, or transportation on a configuration file on the eUICC according to the updated EIS. In addition, in a processing process, compatibility or the like of the configuration file is determined based on the updated EIS, which is helpful in avoiding a case in which the to-be-processed configuration file does not match a capability of the terminal and the status information of the eUICC, so that it is ensured that the terminal functions properly, and processing efficiency is improved.

Figure 4:
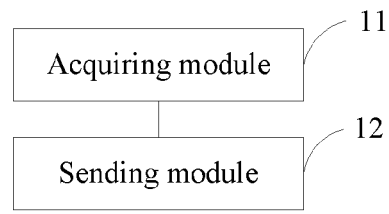
FIG. 4 is a schematic structural diagram of an eUICC according to Embodiment 4 of the present invention.

FIG. 4 is a schematic structural diagram of an eUICC according to Embodiment 4 of the present invention, and as shown in FIG. 4, the eUICC in this embodiment includes:
an acquiring module 11, configured to acquire capability information of a terminal in which the eUICC is embedded; and
a sending module 12, configured to send the capability information of the terminal to an SM platform, so that the SM platform manages a configuration file profile on the eUICC or generates a profile or manages the eUICC according to the capability information of the terminal.

Specifically, the capability information of the terminal includes one or more of the following: a type of a radio access technology RAT supported by the terminal, a concurrent working capability of a radio access technology supported by the terminal, type information of the terminal, whether the terminal supports a packet switched PS domain service, and whether the terminal supports a circuit switched CS domain service.

The eUICC in this embodiment may be configured to execute the technical solution in the method embodiment shown in FIG. 1, and implementation principles and technical effects of the eUICC are similar to those of the method embodiment shown in FIG. 1, and are not described herein again.

Figure 5:
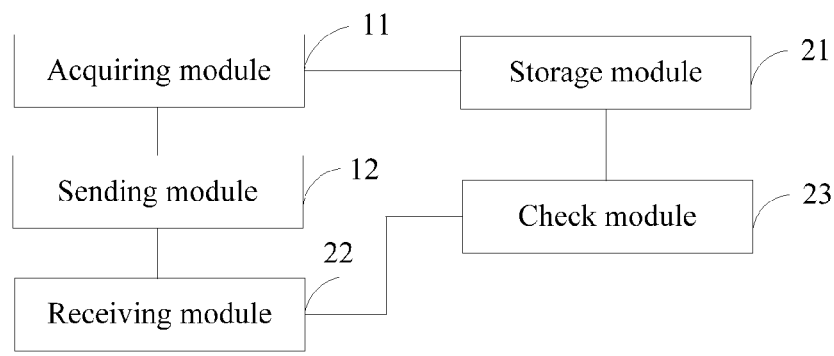
FIG. 5 is a schematic structural diagram of an eUICC according to Embodiment 5 of the present invention.

FIG. 5 is a schematic structural diagram of an eUICC according to Embodiment 5 of the present invention. As shown in FIG. 5, the eUICC in this embodiment is based on the embodiment shown in FIG. 4, and the sending module 12 is specifically configured to:
send the capability information of the terminal to the SM platform, so that the SM platform updates the capability information of the terminal to an eUICC information set EIS of the eUICC, and manages the profile on the eUICC or generates a profile or manages the eUICC according to the updated EIS.

The eUICC further includes:
a storage module 21, configured to locally save the capability information of the terminal.

The eUICC further includes:
a receiving module 22, configured to receive a profile activation indication sent by the SM platform, where the activation indication includes a storage location identifier of a to-be-activated profile on the eUICC; and
a check module 23, configured to check, according to the locally saved capability information of the terminal, whether to respond to the profile activation indication.

The SM platform includes one or both of the following:
a subscription manager-secure routing SM-SR and a subscription manager-data preparing SM-DP.

The eUICC in this embodiment may be configured to execute the technical solution in the method embodiment shown in FIG. 2, and implementation principles and technical effects of the eUICC are similar to those of the method embodiment shown in FIG. 2, and are not described herein again.

Figure 6:
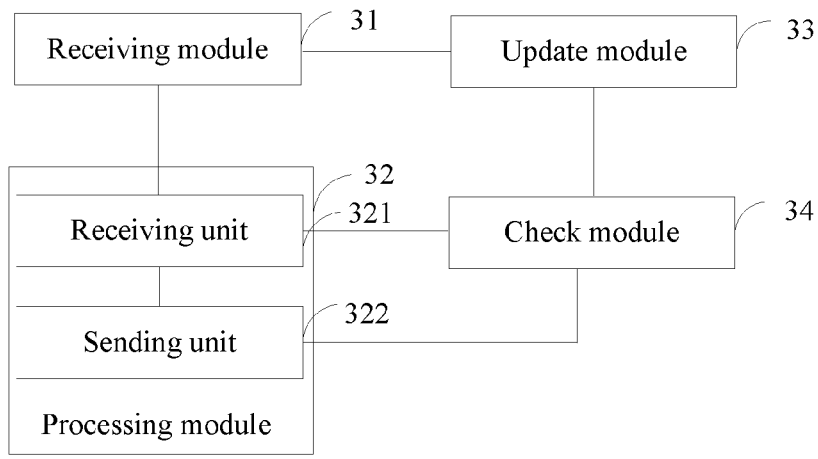
FIG. 6 is a schematic structural diagram of an SM-SR according to Embodiment 6 of the present invention.

FIG. 6 is a schematic structural diagram of an SM-SR according to Embodiment 6 of the present invention, and as shown in FIG. 6, the SM-SR in this embodiment includes:
a receiving module 31, configured to receive capability information that is sent by a first eUICC and that is of a first terminal in which the first eUICC is embedded; and
a processing module 32, configured to manage a profile on the first eUICC or generate a profile or manage the first eUICC according to the capability information of the first terminal.

The SM-SR further includes:
an update module 33, configured to update the capability information of the first terminal to an eUICC information set EIS of the first eUICC; and
accordingly, the processing module 32 is further configured to:
manage the profile on the first eUICC or generate the profile or manage the first eUICC according to the updated EIS.

Specifically, the capability information of the first terminal includes one or more of the following: a type of a radio access technology RAT supported by the first terminal, a concurrent working capability of a radio access technology supported by the first terminal, type information of the first terminal, whether the first terminal supports a packet switched PS domain service, and whether the first terminal supports a circuit switched CS domain service.

Further, the processing module 32 includes:
a receiving unit 321, configured to receive a profile download request, where the download request includes an identifier of a to-be-downloaded profile and an identifier of the first eUICC; and
a sending unit 322, configured to send the capability information of the first terminal to an SM-DP, so that the SM-DP checks, according to the capability information of the first terminal, whether execution of the profile download request is allowed.

The receiving unit 321 is further configured to:
receive a profile activation request, where the activation request includes the identifier of the first eUICC and an identifier of a to-be-activated profile on the first eUICC; and
the SM-SR further includes:
a check module 34, configured to check, according to the capability information of the first terminal, whether execution of the activation request is allowed.

Further, the check module 34 is specifically configured to:
check whether the to-be-activated profile is compatible with the concurrent working capability of the radio access technology supported by the first terminal.

The receiving unit 321 is further configured to:
receive a profile transport request sent by the first eUICC, where the transport request includes an identifier of the first terminal, the identifier of the first eUICC, an identifier of a second terminal, an identifier of a second eUICC, and an identifier of a to-be-transported profile, the second eUICC is embedded in the second terminal, and the transport request is used to request to transport user subscription information in the to-be-transported profile on the second eUICC to the first eUICC; and the check module 34 is further configured to:

perform compatibility check on the to-be-transported profile according to the capability information of the first terminal.

The sending unit 322 is further configured to:

if the to-be-transported profile does not pass compatibility check, send a modification indication to the SM-DP, where the modification indication includes the identifier of the first terminal, the identifier of the first eUICC, and the capability information of the first terminal, so that the SM-DP locally acquires a to-be-modified profile corresponding to the capability information of the first terminal, and modifies, according to the modification indication, the to-be-modified profile to obtain a target profile.

The SM-SR in this embodiment may be configured to execute the technical solution in the method embodiment shown in FIG. 3, and implementation principles and technical effects of the SM-SR are similar to those of the method embodiment shown in FIG. 3, and are not described herein again.

Figure 7:
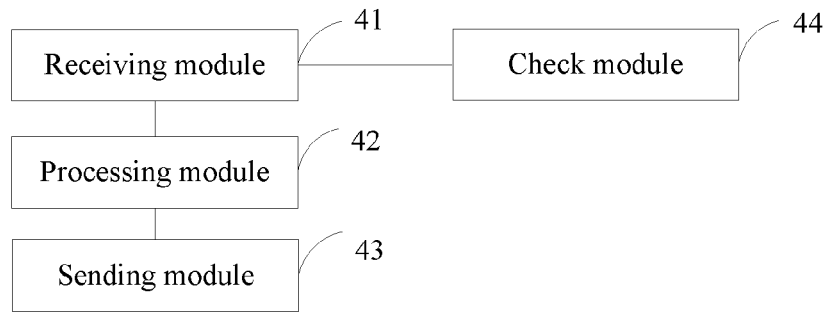
FIG. 7 is a schematic structural diagram of an SM-DP according to Embodiment 7 of the present invention.

FIG. 7 is a schematic structural diagram of an SM-DP according to Embodiment 7 of the present invention, and as shown in FIG. 7, the SM-DP in this embodiment includes:

a receiving module 41, configured to receive capability information that is sent by a first eUICC and that is of a first terminal in which the first eUICC is embedded; and a processing module 42, configured to manage a profile on the first eUICC or generate a profile or manage the first eUICC according to the capability information of the first terminal.

The capability information of the first terminal includes one or more of the following: a type of a radio access technology RAT supported by the first terminal, a concurrent working capability of a radio access technology supported by the first terminal, type information of the first terminal, whether the first terminal supports a packet switched PS domain service, and whether the first terminal supports a circuit switched CS domain service.

The SM-DP further includes:

a sending module 43, configured to send a profile download request to an SM-SR, where the download request includes an identifier of a to-be-downloaded profile and an identifier of the first eUICC;

the receiving module 41 is further configured to receive the capability information of the first terminal that is returned by the SM-SR; and the SM-DP further includes:

a check module 44, configured to check, according to the capability information of the first terminal, whether execution of the profile download request is allowed.

Specifically, the check module 44 is specifically configured to:

check whether the to-be-downloaded profile is compatible with the type of the radio access technology RAT supported by the first terminal.

The receiving module 41 is further configured to:

receive a modification indication sent by the SM-SR, where the modification indication includes an identifier of the first terminal, an identifier of the first eUICC, and the capability information of the first terminal; and the processing module 42 is configured to:

acquire a to-be-modified profile corresponding to the capability information of the first terminal, and modify, according to the modification indication, the to-be-modified profile to obtain a target profile.

The processing module 42 is further configured to:

generate a profile according to obtained subscription data and the capability information of the first terminal.

The SM-DP in this embodiment may be configured to execute the technical solution in the method embodiment shown in FIG. 3, and implementation principles and technical effects of the SM-DP are similar to those of the method embodiment shown in FIG. 3, and are not described herein again.

Figure 8:
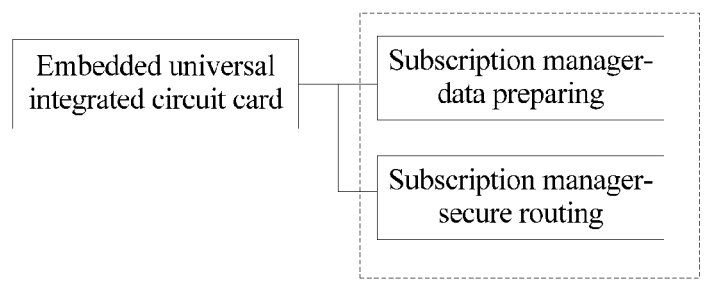
FIG. 8 is a schematic structural diagram of a management system according to Embodiment 8 of the present invention.

FIG. 8 is a schematic structural diagram of a management system according to Embodiment 8 of the present invention, and as shown in FIG. 8, the management system in this embodiment includes:

the embedded universal integrated circuit card eUICC according to the embodiment shown in FIG. 4 or FIG. 5, the subscription manager-secure routing SM-SR according to the embodiment shown in FIG. 6, and the subscription manager-data preparing SM-DP according to the embodiment shown in FIG. 7.

Figure 9:
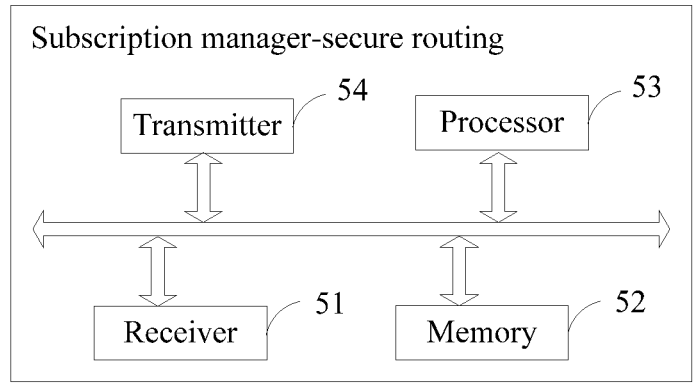
FIG. 9 is a schematic structural diagram of an SM-SR according to Embodiment 9 of the present invention.

FIG. 9 is a schematic structural diagram of an SM-SR according to Embodiment 9 of the present invention, and as shown in FIG. 9, the SM-SR in this embodiment includes:

a receiver 51, a memory 52, and a processor 53 connected to the memory 52, where the receiver 51 is configured to receive capability information that is sent by a first eUICC and that is of a first terminal in which the first eUICC is embedded; and the memory 52 is configured to store a group of program code, and the processor 53 is configured to invoke the program code stored in the memory 52, so as to execute the eUICC management method shown in FIG. 3: managing a profile on the first eUICC or generating a profile or managing the first eUICC according to the capability information of the first terminal.

The capability information of the first terminal includes one or more of the following: a type of a radio access technology RAT supported by the first terminal, a concurrent working capability of a radio access technology supported by the first terminal, type information of the first terminal, whether the first terminal supports a packet switched PS domain service, and whether the first terminal supports a circuit switched CS domain service.

Further, the processor 53 is configured to: update the capability information of the first terminal to an eUICC information set EIS of the first eUICC, and manage the profile on the first eUICC or generate a profile or manage the first eUICC according to the updated EIS.

The receiver 51 is further configured to receive a profile download request, where the download request includes an identifier of a to-be-downloaded profile and an identifier of the first eUICC.

The SM-SR further includes a transmitter 54, configured to send the capability information of the first terminal to an SM-DP, so that the SM-DP checks, according to the capability information of the first terminal, whether execution of the profile download request is allowed.

The transmitter 54 is further configured to send the capability information of the first terminal to the SM-DP, so that the SM-DP checks whether the to-be-downloaded profile is compatible with the type of the radio access technology RAT supported by the first terminal.

The receiver 51 is further configured to receive a profile activation request, where the activation request includes the identifier of the first eUICC and an identifier of a to-be-activated profile on the first eUICC.

The processor 53 is further configured to check, according to the capability information of the first terminal, whether execution of the activation request is allowed.

The processor 53 is further configured to check whether the to-be-activated profile is compatible with the concurrent working capability of the radio access technology supported by the first terminal.

The receiver 51 is further configured to receive a profile transport request sent by the first eUICC, where the transport request includes an identifier of the first terminal, the identifier of the first eUICC, an identifier of a second terminal, an identifier of a second eUICC, and an identifier of a to-be-transported profile, the second eUICC is embedded in the second terminal, and the transport request is used to request to transport user subscription information in the to-be-transported profile on the second eUICC to the first eUICC.

The processor 53 is further configured to: perform compatibility check on the to-be-transported profile according to the capability information of the first terminal, and process the transport request according to a compatibility check result.

The transmitter 54 is further configured to: if the to-be-transported profile does not pass compatibility check, send a modification indication to the SM-DP, where the modification indication includes the identifier of the first terminal, the identifier of the first eUICC, and the capability information of the first terminal, so that the SM-DP locally acquires a to-be-modified profile corresponding to the capability information of the first terminal, modifies, according to the modification indication, the to-be-modified profile to obtain a target profile, and sends the target profile to the SM-SR.

The transmitter 54 is further configured to send the capability information of the first terminal to the SM-DP, so that the SM-DP generates a profile according to obtained subscription data and the capability information of the first terminal.

The processor 53 is further configured to generate or update a management policy rule for the first eUICC according to the capability information of the first terminal.

Figure 10:
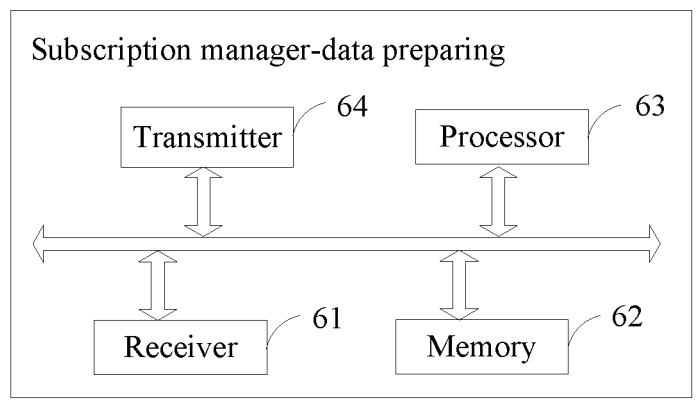
FIG. 10 is a schematic structural diagram of an SM-DP according to Embodiment 10 of the present invention.

FIG. 10 is a schematic structural diagram of an SM-DP according to Embodiment 10 of the present invention, and as shown in FIG. 10, the SM-DP in this embodiment includes:

a receiver 61, a memory 62, and a processor 63 connected to the memory 62, where the receiver 61 is configured to receive capability information that is sent by a first eUICC and that is of a first terminal in which the first eUICC is embedded; and the memory 62 is configured to store a group of program code, and the processor 63 is configured to invoke the program code stored in the memory 62, so as to execute the eUICC management method shown in FIG. 3: managing a profile on the first eUICC or generating a profile or managing the first eUICC according to the capability information of the first terminal.

The capability information of the first terminal includes one or more of the following: a type of a radio access technology RAT supported by the first terminal, a concurrent working capability of a radio access technology supported by the first terminal, type information of the first terminal, whether the first terminal supports a packet switched PS domain service, and whether the first terminal supports a circuit switched CS domain service.

The SM-DP further includes a transmitter 64, configured to send a profile download request to an SM-SR, where the download request includes an identifier of a to-be-downloaded profile and an identifier of the first eUICC.

The receiver 61 is further configured to receive the capability information of the first terminal that is returned by the SM-SR.

The processor 63 is further configured to check, according to the capability information of the first terminal, whether execution of the profile download request is allowed.

The processor 63 is further configured to check whether the to-be-downloaded profile is compatible with the type of the radio access technology RAT supported by the first terminal.

The receiver 61 is further configured to receive a modification indication sent by the SM-SR, where the modification indication includes an identifier of the first terminal, an identifier of the first eUICC, and the capability information of the first terminal.

The processor 63 is further configured to: acquire a to-be-modified profile corresponding to the capability information of the first terminal, and modify, according to the modification indication, the to-be-modified profile to obtain a target profile.

The processor 63 is further configured to generate a profile according to obtained subscription data and the capability information of the first terminal.

Figure 11:
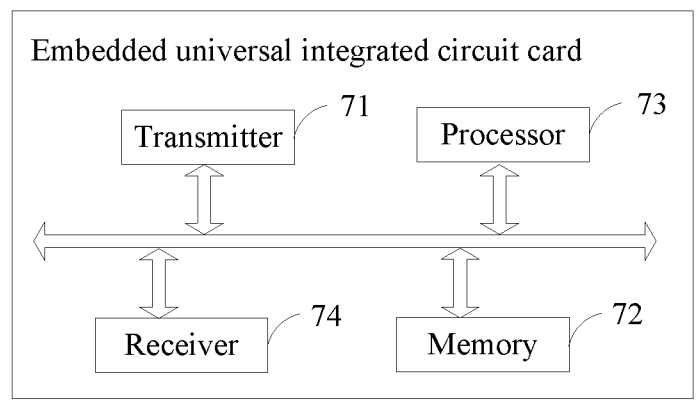
FIG. 11 is a schematic structural diagram of an eUICC according to Embodiment 11 of the present invention.

FIG. 11 is a schematic structural diagram of an eUICC according to Embodiment 11 of the present invention, and as shown in FIG. 11, the eUICC in this embodiment includes:

a transmitter 71, a memory 72, and a processor 73 connected to the memory 72, where the memory 72 is configured to store a group of program code, and the processor 73 is configured to invoke the program code stored in the memory 72, so as to execute the eUICC management method shown in FIG. 1: acquiring capability information of a terminal in which the eUICC is embedded.

The transmitter 71 is configured to send the capability information of the terminal to a subscription management SM platform, so that the SM platform manages a configuration file profile on the eUICC or generates a profile or manages the eUICC according to the capability information of the terminal.

The transmitter 71 is further configured to send the capability information of the terminal to the SM platform, so that the SM platform updates the capability information of the terminal to an eUICC information set EIS of the eUICC, and manages the profile on the eUICC or generates a profile or manages the eUICC according to the updated EIS.

The processor 73 is further configured to locally save the capability information of the terminal.

The eUICC further includes a receiver 74, configured to receive a profile activation indication sent by the SM platform, where the activation indication includes a storage location identifier of a to-be-activated profile on the eUICC.

The processor 73 is further configured to checks, according to the locally saved capability information of the terminal, whether to respond to the profile activation indication.

The capability information of the terminal includes one or more of the following: a type of a radio access technology RAT supported by the terminal, a concurrent working capability of a radio access technology supported by the terminal, type information of the terminal, whether the terminal supports a packet switched PS domain service, and whether the terminal supports a circuit switched CS domain service.

The SM platform includes one or both of the following: a subscription manager-secure routing SM-SR and a subscription manager-data preparing SM-DP.

Persons of ordinary skill in the art may understand that all or some of the steps of the method embodiments may be implemented by a program instructing relevant hardware.

The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An eUICC management method, comprising:
    acquiring, by an embedded universal integrated circuit card (eUICC), capability information of a terminal in which the eUICC is embedded; and
    sending, by the eUICC, the capability information of the terminal to a subscription management (SM) platform, so that the SM platform manages a profile on the eUICC or generates a profile or manages the eUICC according to the capability information of the terminal and information of the eUICC;
    wherein the capability information of the terminal comprises one or more of the following: a type of a radio access technology (RAT) supported by the terminal, a concurrent working capability of a radio access technology supported by the terminal, type information of the terminal, whether the terminal supports a packet switched (PS) domain service, and whether the terminal supports a circuit switched (CS) domain service.

2. The method according to claim 1, wherein the sending, by the eUICC, the capability information of the terminal to a subscription management (SM) platform, so that the SM platform manages a profile on the eUICC or generates a profile or manages the eUICC according to the capability information of the terminal and information of the eUICC comprises:
    sending, by the eUICC, the capability information of the terminal to the SM platform, so that the SM platform updates the capability information of the terminal to an eUICC information set (EIS) of the eUICC, and manages the profile on the eUICC or generates the profile or manages the eUICC according to the updated EIS.

3. The method according to claim 2, after the acquiring, by an embedded universal integrated circuit card (eUICC), capability information of a terminal in which the eUICC is embedded, further comprising:
    locally saving, by the eUICC, the capability information of the terminal.

4. The method according to claim 3, after the sending, by the eUICC, the capability information of the terminal to a subscription management (SM) platform, further comprising:
    receiving, by the eUICC, a profile activation indication sent by the SM platform, wherein the activation indication comprises a storage location identifier of a to-be-activated profile on the eUICC; and
    checking, by the eUICC according to the locally saved capability information of the terminal, whether to respond to the profile activation indication.

5. The method according to claim 4, wherein the SM platform comprises one or both of the following:
    a subscription manager-secure routing (SM-SR) and a subscription manager-data preparing (SM-DP).

6. An eUICC management method, comprising:
    receiving, by an SM platform, capability information that is sent by a first eUICC and that is of a first terminal in which the first eUICC is embedded; and
    managing, by the SM platform, a profile on the first eUICC or generating a profile or managing the first eUICC according to the capability information of the first terminal and information of the first eUICC;
    wherein the capability information of the first terminal comprises one or more of the following: a type of a radio access technology (RAT) supported by the first terminal, a concurrent working capability of a radio access technology supported by the first terminal, type information of the first terminal, whether the first terminal supports a packet switched (PS) domain service, and whether the first terminal supports a circuit switched (CS) domain service.

7. The method according to claim 6, wherein after the receiving, by an SM platform, capability information that is sent by a first eUICC and that is of a first terminal in which the first eUICC is embedded, the method further comprises:
    updating, by the SM platform, the capability information of the first terminal to an eUICC information set (EIS) of the first eUICC; and
    accordingly, the managing, by the SM platform, a profile on the first eUICC or generating a profile or managing the first eUICC according to the capability information of the first terminal and information of the first eUICC comprises:
    managing, by the SM platform, the profile on the first eUICC or generating a profile or managing the first eUICC according to the updated EIS.

8. The method according to claim 6, wherein the SM platform comprises one or both of the following: a subscription manager-secure routing (SM-SR) and a subscription manager-data preparing (SM-DP).

9. The method according to claim 8, wherein the managing, by the SM platform, a profile on the first eUICC according to the capability information of the first terminal comprises:
    receiving, by the SM-SR, a profile download request, wherein the download request comprises an identifier of a to-be-downloaded profile and an identifier of the first eUICC; and
    sending, by the SM-SR, the capability information of the first terminal to the SM-DP, so that the SM-DP checks, according to the capability information of the first terminal, whether execution of the profile download request is allowed.

10. The method according to claim 9, wherein the sending, by the SM-SR, the capability information of the first terminal to the SM-DP, so that the SM-DP checks, according to the capability information of the first terminal, whether execution of the profile download request is allowed comprises:
    sending, by the SM-SR, the capability information of the first terminal to the SM-DP, so that the SM-DP checks whether the to-be-downloaded profile is compatible with the type of the radio access technology (RAT) supported by the first terminal.

11. The method according to claim 8, wherein the managing, by the SM platform, a profile on the first eUICC according to the capability information of the first terminal comprises:

receiving, by the SM-SR, a profile activation request, wherein the activation request comprises an identifier of the first eUICC and an identifier of a to-be-activated profile on the first eUICC; and checking, by the SM-SR according to the capability information of the first terminal, whether execution of the activation request is allowed.

12. The method according to claim 11, wherein the checking, by the SM-SR according to the capability information of the first terminal, whether execution of the activation request is allowed comprises:

checking, by the SM-SR, whether the to-be-activated profile is compatible with the concurrent working capability of the radio access technology supported by the first terminal.

13. The method according to claim 8, wherein the managing, by the SM platform, a profile on the first eUICC according to the capability information of the first terminal comprises:

receiving, by the SM-SR, a profile transport request sent by the first eUICC, wherein the transport request comprises an identifier of the first terminal, an identifier of the first eUICC, an identifier of a second terminal, an identifier of a second eUICC, and an identifier of a to-be-transported profile, the second eUICC is embedded in the second terminal, and the transport request is used to request to transport user subscription information in the to-be-transported profile on the second eUICC to the first eUICC; and performing, by the SM-SR, compatibility check on the to-be-transported profile according to the capability information of the first terminal, and processing the transport request according to a compatibility check result.

14. The method according to claim 13, wherein the processing the transport request according to a compatibility check result comprises:

if the to-be-transported profile does not pass compatibility check, sending, by the SM-SR, a modification indication to the SM-DP, wherein the modification indication comprises the identifier of the first terminal, the identifier of the first eUICC, and the capability information of the first terminal, so that the SM-DP locally acquires a to-be-modified profile corresponding to the capability information of the first terminal, modifies, according to the modification indication, the to-be-modified profile to obtain a target profile, and sends the target profile to the SM-SR.

15. The method according to claim 8, wherein the generating, by the SM platform, a profile according to the capability information of the first terminal comprises:

sending, by the SM-SR, the capability information of the first terminal to the SM-DP, so that the SM-DP generates a profile according to obtained subscription data and the capability information of the first terminal.

16. The method according to claim 8, wherein the managing, by the SM platform, the first eUICC according to the capability information of the first terminal comprises:

generating or updating, by the SM-SR, a management policy rule for the first eUICC according to the capability information of the first terminal.

17. An SM platform, comprising:

a receiver;

a processor; and a memory coupled to the processor and storing instructions for execution by the processor;

the processor being configured to execute the instructions to perform operations of:

receiving, by the SM platform, capability information that is sent by a first eUICC and that is of a first terminal in which the first eUICC is embedded; and managing, by the SM platform, a profile on the first eUICC or generating a profile or managing the first eUICC according to the capability information of the first terminal and information of the first eUICC;

wherein the capability information of the first terminal comprises one or more of the following: a type of a radio access technology (RAT) supported by the first terminal, a concurrent working capability of a radio access technology supported by the first terminal, type information of the first terminal, whether the first terminal supports a packet switched (PS) domain service, and whether the first terminal supports a circuit switched (CS) domain service.

* * * * *